Figure 1:
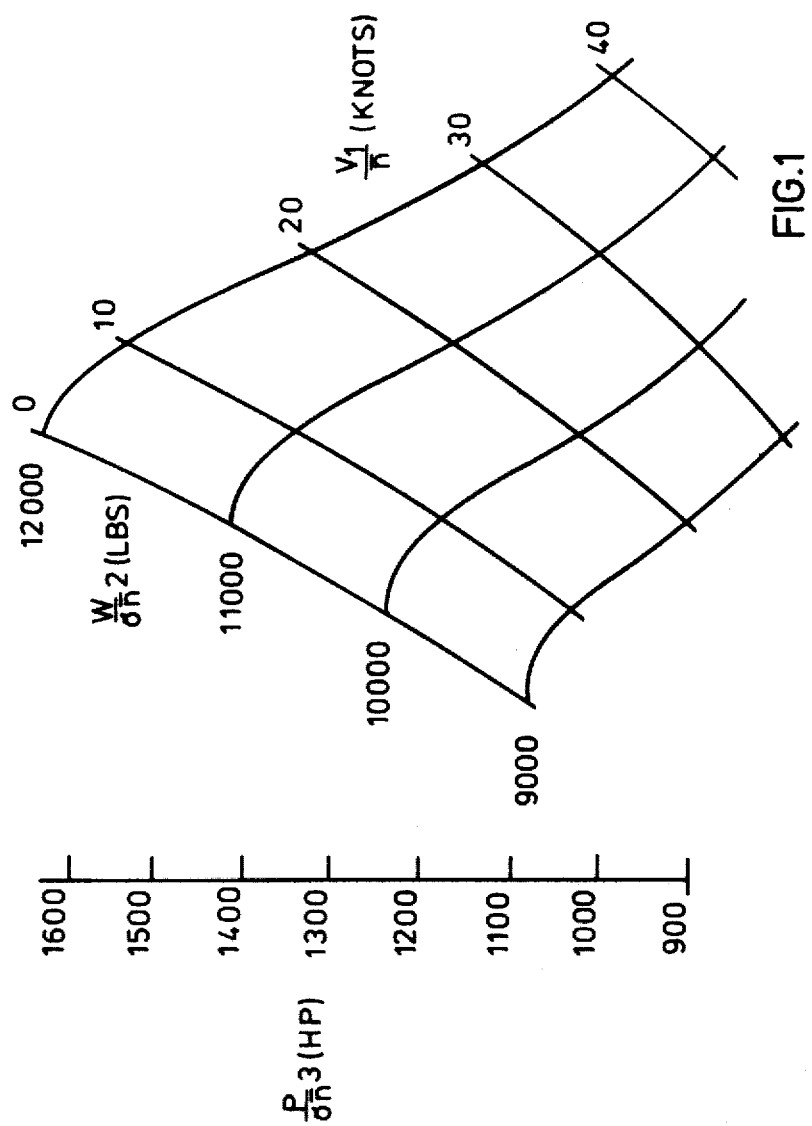

United States Patent [19]

Doe

[11] 4,300,200

[45] Nov. 10, 1981

[54] HELICOPTER AIRSPEED INDICATING SYSTEM

[75] Inventor: Reginald A. Doe, Yeovil, England

[73] Assignee: Westland Aircraft Limited, Yeovil, England

[21] Appl. No.: 96,829

[22] Filed: Nov. 23, 1979

[30] Foreign Application Priority Data

Dec. 1, 1978 [GB] United Kingdom ............... 46895/78

[51] Int. Cl.³ .............................................. G06F 15/20
[52] U.S. Cl. .................................... 364/565; 364/431; 244/17.13; 73/509
[58] Field of Search ............... 364/565, 567, 431, 432, 364/433, 426; 244/17.13; 73/509, 510, 530

[56] References Cited

U.S. PATENT DOCUMENTS

| | | | |
|---|---|---|---|
| 3,761,693 | 9/1973 | Fleury | 364/424 X |
| 3,927,306 | 12/1975 | Miller | 244/17.13 X |
| 3,963,372 | 6/1976 | McLain et al. | 364/431 X |
| 3,969,890 | 7/1976 | Nelson | 364/431 X |
| 4,156,912 | 5/1979 | Shigeta et al. | 364/715 X |
| 4,236,212 | 11/1980 | Arents | 364/431 X |

*Primary Examiner*—Edward J. Wise
*Attorney, Agent, or Firm*—Larson and Taylor

[57] ABSTRACT

This invention provides a helicopter airspeed indicating system for providing an indication of a theoretical airspeed of a helicopter in which it is fitted. The airspeed is calculated using measured weight and power values and a known relationship between power, weight and airspeed characteristics of the helicopter, and is particularly useful for providing an indication of helicopter airspeed at the low end of an overall speed range.

11 Claims, 2 Drawing Figures

HELICOPTER AIRSPEED INDICATING SYSTEM

THIS INVENTION relates to a helicopter airspeed indicating system particularly but not exclusively for use in indicating the airspeed of a helicopter at the low end of an overall speed range.

Conventional helicopter airspeed indication systems utilise pressure heads and static sources and are prevented from providing accurate indications at low airspeeds due to the disturbing influence of the downwash from the helicopter main rotor. Their ability to provide accurate, or any, information is further complicated when a rate of climb or descent is associated with the low airspeed.

Accordingly, in one aspect, the invention provides a helicopter airspeed indicating system adapted to provide an indicatin of a theoretical airspeed of a helicopter in which it is fitted, wherein the airspeed is calculated using measured weight and power values and a known relationship between power, weight and airspeed characteristics of the helicopter.

In another aspect, the invention provides a helicopter airspeed indicating system for providing an indication of a theoretical airspeed of a helicopter in which it is fitted, wherein electrical signals representative of helicopter weight and power being applied are fed to computing means for processing with stored data based on a known relationship between power, weight and airspeed level flight characteristics, said computing means providing a resultant signal representative of a theoretical airspeed of the helicopter, and means responsive to said resultant signal for indicating said theoretical airspeed.

Preferably, said computing means is adapted to modify the power signal to compensate for power being absorbed in vertical, horizontal and lateral accelerations and any rate of climb of the helicopter. The power signal may be modified to a signal representative of the power that would be being applied in an equivalent level flight condition, and the modified signal may be obtained by subtracting the sum of power being absorbed in respect of any vertical, horizontal and lateral accelerations and rate of climb from an actual power being absorbed.

The computing means may include means for the input of electrical signals representative of a weight of the helicopter and a position of its center of gravity, means for establishing a zero value of airspeed within the circuit and means for triggering the circuit when the helicopter leaves the ground. Conveniently, the triggering means may be activated by rate of climb instrumentation.

The computing means may include means for calculating, from input signals representative of various operational parameters, values of power being absorbed in any climb and any horizontal, vertical and lateral accelerations, means for storing data based on a known relationship between power, weight and airspeed characteristics of the helicopter, means for calculating a value of theoretical level flight power that should be absorbed based on said stored data and a particular value of airspeed being processed, means for comparing the theoretical power with a calculated value of level flight power actually being absorbed, means for determining whether said compared values are within a preselected limit, and display means for indicating the value of airspeed being processed when the compared values are within the pre-selected limit. Preferably, the computing means includes sampling means adapted to provide a display of the theoretical airspeed at pre-selected intervals. The display means preferably comprises a digital display.

The computing means may include means for treating a signal representative of a value of theoretical airspeed being processed that is not within the pre-selected limit with a pre-selected increment so as to produce an adjusted resultant signal that is fed back into the computing means for re-processing.

The computing means may include means for treating a signal representative of the displayed theoretical airspeed with a pre-selected increment, the adjusted signal being fed back into the computing means for re-processing. Preferably, means are provided for determining whether said adjusted signal is representative of an airspeed less than zero and to re-instate a zero value for the theoretical airspeed, the re-instated value being fed back into the computing means for re-processing.

The helicopter airspeed indicating system may be used to indicate the theoretical airspeed within a low range of an overall helicopter airspeed range. Preferably, the low range is between zero and 50 knots. In such an installation, the system may be used in combination with a further airspeed indicating means and conveniently, the further means may include means to isolate the indicating system hereinbefore described when the airspeed increases above the low range limit. Preferably, the display means of the system for indicating the low airspeed range is incorporated in an instrument for indicating the airspeed measured by the further airspeed indicating system.

Figure 2:
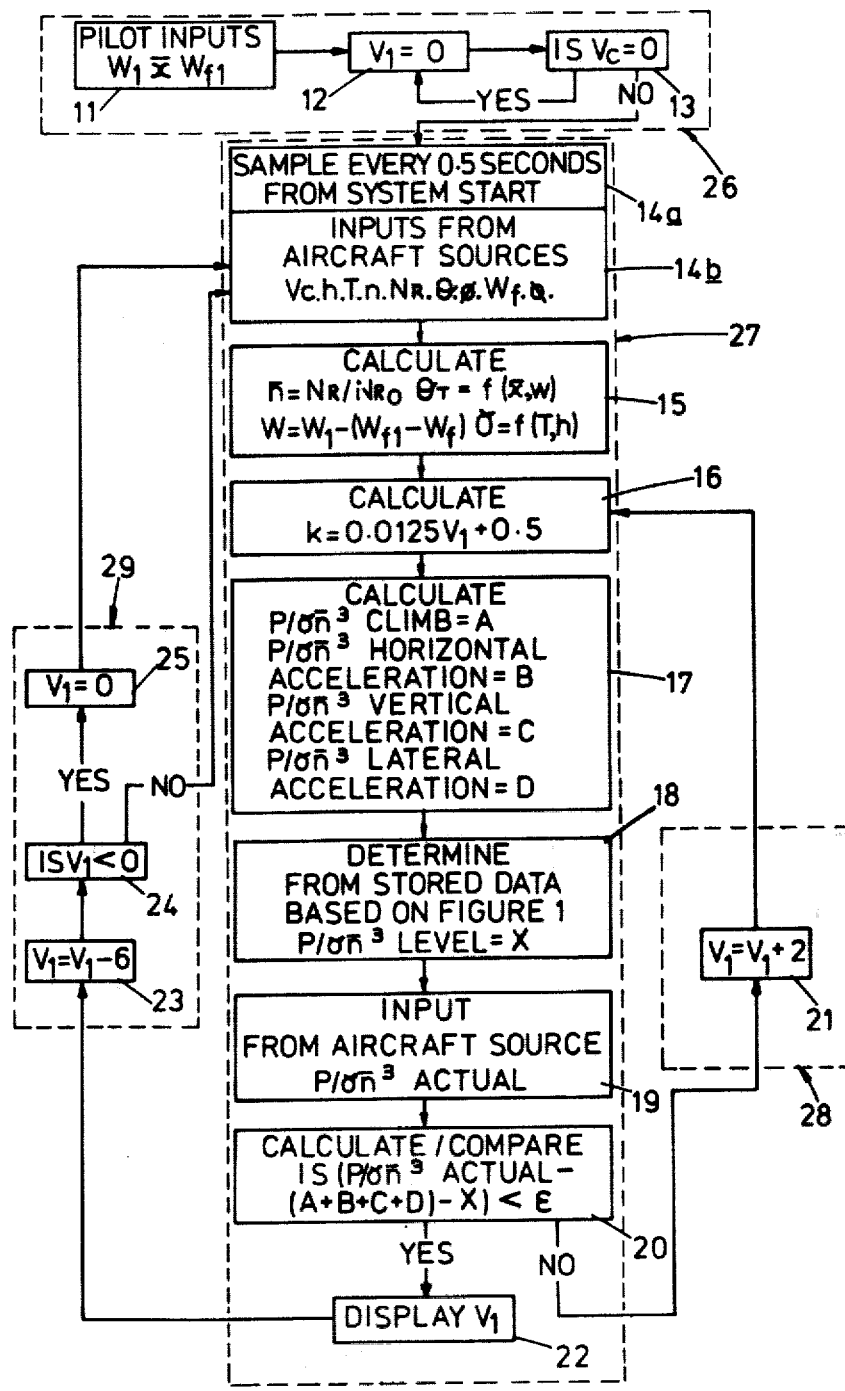

The invention will now be described by way of example only and with reference to the accompanying drawings in which:

FIG. 1 is a carpet plot illustrating the low speed characteristics for level flight of a particular helicopter at various take-off weights and power, and FIG. 2 is a logic diagram of a process according to one embodiment of the invention for computing the theoretical airspeed of a helicopter.

Various symbols appearing in the following description have the meanings set out below:

P = Torque obtained from a torque signal and rotor R.P.M. Tachometer.

$\sigma$ = Atmospheric relative density obtained from T and h.

$\bar{n}$ = Ratio of prevailing rotor speed $N_R$ (r.p.m.) over datum rotor speed $N_{RO}$ (r.p.m.).

k = An induced factor for climb power dependent on airspeed varying linearly from 0.5 at zero airspeed at 1.0 at 40 knots.

W = Aircraft weight (lb) equalling take-off weight minus fuel gone.

$W_1$32 Aircraft weight (lb) at commencement of flight.

$W_F$ = Fuel contents (progressive) (lb).

$W_{F1}$ = Aircraft load fuel (lb) at commencement of flight.

$\bar{x}$ = Aircraft fore-and-aft c.g. position (inches).

Z = Overall efficiency factor (main rotor power as a fraction of total power).

$V_c$ = Rate of climb n = Normal g.

$\theta$ = Pitch attitude (nose up positive).

$\theta_T$ = Datum trim attitude expressed as a function of fore-and-aft c.g. position.

$V_1$ = Forward airspeed.

$\phi$ = Roll attitude, positive left wing down.

$\phi_O$ = Datum trim attitude h = Aircraft barometric altitude (ft).

T = Outside air temperature (°C.).

$\phi$ = Aircraft Torque (lb ft).

The low speed level flight characteristics of a particular helicopter are illustrated in FIG. 1, and are derived from calculations during the helicopter design stage and confirmed by measurements taken during development flights. It will be seen that power $(P/\sigma\bar{n}^3)$ is the independent variable, and the effect of external stores is ignored since the invention is concerned only with low airspeed characteristics.

The plot of FIG. 1 provides informaton as to the airspeed capabilities of the helicopter $V_1/\bar{n}$ (knots) for various aircraft weights $W\pi\bar{n}^2$ (pounds) and applied power $P/\pi\bar{n}^3$ (H.P.) and, having established these characteristics, the present invention in its simplest form relies on a reversal of the process to calculate a theoretical airspeed from known values of power and aircraft weight. Thus, the invention provides a process which deduces the theoretical airspeed from a processing of relevant aircraft data, and applying the result of this process to the helicopter low speed power required characteristics. Various operating parameters are taken into account and are processed in association with the helicopter low speed power required characteristics shown in FIG. 1 which is programmed into the processing equipment, to provide the means of generating an indication of the theoretical airspeed of the helicopter.

To a good first approximation the characteristics of FIG. 1 hold good for forward, sideways and rearward flight however, the important parameter is forward flight speed and it is this condition that is chosen in the following description of the invention.

To increase the accuracy of the present invention it is desirable to take account of accelerations of the helicopter, particularly horizontal acceleration and rate of climb, and this is achieved by automatically adjusting a signal representative of applied total power so as to provide a signal representative of an equivalent level flight power.

This is achieved by subtracting the sum of the power being absorbed by the climb, and vertical, horizontal and lateral accelerations of the helicopter from the actual power being applied, i.e., $(P/\sigma\bar{n}^3)$ Equivalent Level = $(P/\sigma\bar{n}^3)$ Actual $- (P/\sigma\bar{n}^3)$ Climb $- (P/\sigma\bar{n}^3)$ Vertical Acceleration $- (P/\sigma\bar{n}^3)$ Horizontal Acceleration $- (P/\sigma\bar{n}^3)$ Lateral Acceleration.

Generation of the terms of this formula provides:

(a) $P/\sigma\bar{n}^3$ Climb $= \dfrac{kWV_c}{33000\eta\sigma} \cdot \dfrac{1}{\bar{n}^3}$ (b) $P/\sigma\bar{n}^3$ Vertical Acceleration $= \dfrac{W}{\sigma} \cdot \dfrac{(n-1)V_c}{33000\eta} \cdot \dfrac{1}{\bar{n}^3}$ (c) $P/\sigma\bar{n}^3$ Horizontal Acceleration $=$
$\dfrac{W}{\sigma} (-\theta + \theta_T) \dfrac{1.69V}{550\eta} \cdot \dfrac{1}{\bar{n}^3}$ (d) $P/\sigma\bar{n}^3$ Lateral Acceleration $= \dfrac{W}{\sigma} |(\phi - \phi_o)| \dfrac{1.69V}{550\eta} \cdot \dfrac{1}{\bar{n}^3}$ It will be noted that solution of three of the above terms, namely a, c and d, are dependent upon the parameter with which the invention is concerned, i.e $V_1$ (forward airspeed) therefore, the process now to be described for determining the value of $V_1$ is an iterative process that will rapidly converge under the majority of circumstances.

Referring now to FIG. 2, to set up the process of the invention the pilot feeds in signals at block 11 in a set-up circuit 26 which are representative of $W_1$, $\bar{x}$ and $W_{fl}$.

A block 12 in the logic sets the value of $V_1$ at zero, and block 13 represents a function which establishes whether $V_c$ is at zero. It will be apparent that if $V_c$ is at zero then the helicopter has not left the ground so that there can be no forward airspeed, and this information is fed back through block 12. As soon as the value of $V_c$ is other than zero, a signal is passed to a processing and display circuit 27 to activate the circuit which operates as hereinafter described.

Block 14a represents a function which provides for a sample indication of theoretical airspeed to be taken at any desired interval; an interval of 0.5 seconds having been chosen in the illustrated embodiment.

Signals representative of various parameters are obtained from appropriate sources on the helicopter and fed into the system at block 14b. These signals consist of signals representative of $V_c$, n, $\theta$, $\phi$, h, T, $N_R$, $W_f$ and $\phi$.

These signals are then processed at block 15 to calculate values of $\bar{n}$ ($N_{RO}$ being represented by a constant built into the logic), $\phi_T(=F(\bar{x} \cdot W))$, W and $\sigma(=f(T \cdot h))$.

A processing function represented by block 16 calculates a value of factor k and, as previously noted, the integer 0.5 will vary dependent upon the particular value of $V_1$ which is being processed through the circuit.

The resultant values of the calculations of the functions of blocks 15 and 16 are passed to block 17 wherein values are calculated for $P/\sigma\bar{n}^3$ climb (A), $P/\sigma\bar{n}^3$ horizontal acceleration (B), $P/\sigma\bar{n}^3$ vertical acceleration (C) and $P/\sigma\bar{n}^3$ lateral acceleration (D).

A computing function in block 18 uses built in data based on the information of FIG. 1 to calculate a value of the level flight power $P/\sigma\bar{n}^3$ that should be absorbed based on the weight $W/\sigma\bar{n}^2$ and the value of airspeed $V_1/\bar{n}$ that is currently being processed in the circuit. This value is designated X at block 18 in FIG. 2.

The signal $\phi$ provides a signal representative of the actual power $(P/\sigma\bar{n}^3$ Actual) being absorbed by the helicopter at block 19, and the resultant signals from the functions of blocks 17, 18 and 19 are processed in block 20 by a computing function which calculates a value of the equivalant level flight power being absorbed, i.e. $P/\sigma\bar{n}^3$ Actual $-(A+B+C+D)$ and compares this value with value X from the function of block 18. The function of block 20 also determines whether the equivalent level flight power being absorbed is within an arbitrary value $\epsilon$ (H.P.) of the value X from block 18, the value $\epsilon$ being selected in a particular system to provide a desired degree of accuracy of airspeed calculation for any particular helicopter and the roles in which it is to operate. For example, in one particular system the value of $\epsilon$ selected is 30 Horse Power.

If the requirement of the function of block 20 is not satisfied then the particular value of airspeed $V_1$ being processed is fed to an adjusting circuit 28 in which the value of $V_1$ is raised at block 21 by a pre-selected increment (2 knots in the illustrated embodiment) and the resultant value is fed back to block 16 for re-processing through blocks 17 to 20 inclusive in a manner similar to that hereinbefore described.

When the particular requirement of the function of block 20 is satisfied, the value of $V_1$ being processed through the circuit is considered sufficiently accurate for the particular installation, and that value of $V_1$ is passed to a digital display 22 for display to the pilot.

A signal representative of the value of the indicated airspeed $V_1$ is fed to an up-date circuit 29 in which the value is firstly decreased in block 23 by a pre-selected increment (6 knots in the illustrated embodiment), and is then compared with a zero knot value at block 24. If the adjusted value of $V_1$ is greater than zero knots a representative signal of the adjusted value is fed back to block 14b for re-processing through the circuit. Should the logic of block 24 determine that the adjusted value of $V_1$ is less than zero the adjusted value is fed through the function of block 25 which re-instates a zero knot value for $V_1$, and a signal representative thereof is fed back to block 14b for re-processing.

Thus, the system of the present invention provides a visual indication of the theoretical airspeed of a helicopter based on the known characteristics of a relationship between applied power, weight and airspeed for the particular helicopter. Furthermore, the system includes a continuous and automatic up-dating facility, and compensates automatically for changes in applied power, for power being absorbed in climb and vertical, horizontal and lateral accelerations, and for changes in weight during flight due to the continuous reduction in the fuel load. The arrangement is totally unaffected by rotor downwash, and the degree of accuracy can be pre-selected to be within desired limits for any particular installation by pre-selection of the limits imposed by the value $\epsilon$.

It is envisaged that the indicating system of the present invention will be used in conjunction with a conventional A.S.I. system for indication of the low airspeed of the helicopter, say from zero to about 50 knots, above which the airspeed would be indicated on a conventional A.S.I. indicator. In such an installation, a trip fed from the A.S.I. may be incorporated to switch out the logic circuit above a pre-selected speed (e.g. 50 knots). Preferably, the digital display unit 22 will be incorporated in the facia of the conventional A.S.I. indicator.

The various computing functions hereinbefore described may be provided in an individual package unit for incorporation in a helicopter or, where suitable facilities are available, may be programmed into existing on-board computing facilities.

Whilst one embodiment has been described and illustrated, it will be understood that many modifications may be made without departing from the scope of the invention as defined in the appended claims. For instance, a signal representative of the prevailing wind speed may be fed into the system set-up circuit at block 11, and the block 12 may incorporate an indicator to display the wind speed prior to take off. The function of block 13 may be initiated by movement of the helicopter collective pitch control mechanism so as to trigger the processing and display circuit when the collective control is moved away from its minimum setting position. The limits of accuracy can be varied by selection of any desired value of $\epsilon$ in block 20, and the integers of the functions of blocks 21 and 23 can be varied to suit any particular installation. A hold facility may be incorporated in the digital display unit 22.

I claim as my invention:

1. An on board apparatus for estimating the low end airspeed of a helicopter during flight comprising:
   means for determining the helicopter applied power;
   means for determining the weight of the helicopter;
   means for storing predetermined confirmed measurements of the airspeed of the helicopter at various applied powers and weights;
   means for determining an estimated airspeed using the determined power and weight and the stored measurements, and for outputting a signal; and
   indicator means coupled to said determining means and responsive to said signal for displaying the estimated airspeed.

2. An airspeed apparatus as claimed in claim 1 wherein said means for storing measurements and said means for determining an estimated airspeed is a computer.

3. An airspeed apparatus as claimed in claim 2 wherein said computer compensates the determined applied power for power absorbed in vertical, horizontal and lateral accelerations and in rate of climb such that the compensated applied power is equivalent to the power for level flight conditions.

4. An airspeed apparatus as claimed in claim 3 further including means to actuate the airspeed apparatus as the helicopter leaves the ground.

5. An airspeed apparatus as claimed in claim 4 further including means to deactuate the airspeed apparatus when a maximum speed is exceeded.

6. An airspeed apparatus as claimed in claim 3 further including means for determining the position of the center of gravity of the helicopter.

7. An airspeed apparatus as claimed in claim 3 wherein said means to determine applied power and weight are continuously updated.

8. An on board method for estimating the low end airspeed of a helicopter during flight comprising the steps of:
   determining the helicopter applied power;
   determining the weight of the helicopter;
   determining an estimated airspeed of the helicopter and outputting a signal based on predetermined confirmed measurements of the airspeed of the helicopter at various applied powers and weights; and
   displaying the estimated airspeed on an indicator responsive to the outputted signal.

9. A method for estimating airspeed as claimed in claim 8 wherein the predetermined measurements are stored in a computer.

10. A method for estimating airspeed as claimed in claim 9 further including the step of compensating the determined value of applied power to an equivalent level flight power by accounting for power being absorbed by vertical, horizontal and lateral acceleration and by rate of climb.

11. A method for estimating airspeed as claimed in claim 10 further including the steps of:
   assigning the airspeed an initial value of zero;
   determining an estimated power from the stored measurements in the computer using the initial airspeed value and determined weight;
   comparing the estimated power with the equivalent level flight power;
   displaying the airspeed value where the estimated value is within a predetermined limit of the equivalent power value;
   adjusting the airspeed value by a pre-selected increment; and
   repeating the comparison of estimated power with equivalent power using the adjusted airspeed value and new determination of applied power and weight such that a continuous, iterative determination of airspeed is conducted.

* * * * *